United States Patent [19]
Keel et al.

[11] Patent Number: 5,923,709
[45] Date of Patent: Jul. 13, 1999

[54] INTELLIGENT CABLE ASSEMBLY

[75] Inventors: Alton Keel, Hellam; Jeffrey Kuhlmann, Lancaster; Mark Edward Trafford, West Reading, all of Pa.

[73] Assignee: Vulcan Northwest Inc., Bellevue, Wash.

[21] Appl. No.: 08/701,901

[22] Filed: Aug. 23, 1996

[51] Int. Cl.$^6$ ...................................................... H04B 3/00
[52] U.S. Cl. ............................................................ 375/257
[58] Field of Search ...................................... 375/257, 258, 375/222, 259, 276, 282, 289; 361/600

[56] References Cited

U.S. PATENT DOCUMENTS 5,566,166  10/1996  Lee et al. .................................. 370/289

*Primary Examiner*—Tesfaldet Bocure
*Attorney, Agent, or Firm*—Panitch Schwarze Jacobs & Nadel, P.C.

[57] ABSTRACT

A cable assembly includes hardware for interconnecting an ISDN upgradeable modem with an ISDN communication line to allow the modem to communicate over the ISDN communication line. The cable assembly has a DIN type connector for connecting to the modem and an RJ45 type connector for connecting to the ISDN communication line. The hardware, located within a housing of the cable assembly, includes line isolation means, over current protection means and control logic. The control logic comprises a U and/or an ST interface.

21 Claims, 2 Drawing Sheets

INTELLIGENT CABLE ASSEMBLY

FIELD OF THE INVENTION

The present invention relates generally to a cable for connecting a modem or computing device containing a modem to a communication line and more particularly, to a cable assembly for connecting an Integrated Services Digital Network (ISDN) upgradeable modem to an ISDN communication line.

BACKGROUND OF THE INVENTION

Modems are used to transmit data between data terminal equipment over a communication line. Typically, a modem is connected between a computer, such as a personal computer (PC) and a telephone or other communication line (e.g., an ISDN line or a coaxial cable), such that the computer can communicate with another computer, which also is connected to a modem, by way of the telephone line. The modem receives digital data from the PC and modulates or converts the digital data to analog data signals (in the case of a plain old telephone system (POTS) line) and transmits the analog signal over the telephone line to another modem, connected to another computer or PC. The modem also receives data, such as analog data, demodulates and converts the analog data to corresponding digital data, and provides the digital data to the computer. Of course, the modem must also perform many other functions, such as modulation, filtering, compression/decompression, and protocol establishment. Such modem devices are relatively well known and widely commercially available. For example, the Cardinal Technologies, Inc. MVP288IS modem provides 28,800 bps data transmission using industry standard protocols, data compression and error correction.

With the development of increasingly powerful PCs able to perform sophisticated data manipulation and display graphic and video images, along with the increase in accessibility to digital information, such as via the internet, computer users are demanding that communication lines and modems be able to handle data at increasingly faster rates. Accordingly, a protocol for transmitting digital data has been established, known as ISDN (Integrated Services Digital Network) which is described in the ANSI standard T1.601 entitled, "*Integrated Services Digital Network (ISDN)—Basic Access Interface for Use on Metallic Loops for Application on the Network Side of the NT (Layer 1 Specification)*", published 1992 by the American National Standards Institute. Digital data can be transmitted at faster rates than analog data and devices receiving such digital data are no longer required to convert the data from analog to digital, and vice-versa. Accordingly, modems which are capable of operating in accordance with the ISDN protocol are able to transmit, receive and process data more efficiently than modems which transmit and receive only analog data. Although many computer users do not presently have access to an ISDN communication line, ISDN communication lines are becoming more commonplace. Accordingly, it is desirable to provide a modem which is upgradeable to operate in accordance with the ISDN protocol.

The present invention comprises an intelligent cable assembly for connecting an ISDN upgradeable modem to an ISDN communication line. The ISDN upgradeable modem includes an incremental amount of hardware to support the ISDN protocol, a processor with a direct memory access (DMA), and an interface means for communicating with a host processor. Through the use of a modem processor which supports DMA, firmware supporting the ISDN protocol can be downloaded to the modem processor to allow the modem to operate in accordance with the ISDN protocol. The cable assembly includes a housing which contains the electronic components necessary for receiving a signal transmitted over the ISDN communication line and isolating and converting the ISDN signal to a synchronous or asynchronous serial or parallel digital signal. In contrast, prior art ISDN modems support the ISDN protocol using specialized hardware, such as a separate processor and a separate controller, which correspondingly raises the cost and complexity of the modem.

The cable assembly of the present invention allows a flexible and inexpensive means of upgrading a modem to communicate over an ISDN communication line.

SUMMARY OF THE INVENTION

Briefly stated, the present invention comprises an intelligent cable assembly for connecting a modem device to an ISDN communication line for allowing the modem device to transmit a first digital signal over the ISDN communication line and to receive a second digital signal transmitted over the ISDN communication line. The cable assembly comprises:

a first connector for electrically connecting the cable assembly to the modem device;

a second connector for electrically connecting the cable assembly to the ISDN communication line;

line isolation means electrically connected to the ISDN communication line by way of the second connector for electrically isolating the ISDN communication line from the modem device;

protection means electrically connected to the line isolation means for protecting the modem device from electrical transients occurring on the ISDN communication line; and control logic electrically connected to the protection means and the first connector for converting the first digital signal to a synchronous serial digital signal.

The present invention also comprises an intelligent cable assembly for connecting a modem device to an ISDN communication line for allowing the modem device to transmit a first digital signal over the ISDN communication line and to receive a second digital signal transmitted over the ISDN communication line, the cable assembly comprising:

a housing having opposing sides;

a DIN type connector disposed on a side of the housing, the DIN connector for electrically connecting the cable assembly to the modem device;

an RJ45 type connector disposed on a side of the housing, the RJ45 connector for electrically connecting the cable assembly to the ISDN communication line;

line isolation and protection means disposed within the housing and electrically connected to the RJ45 type connector for electrically isolating the ISDN communication line from the modem device and for protecting the modem device from electrical transients occurring on the ISDN communication line;

control logic disposed within the housing and electrically connected to the line isolation and protection means and the DIN type connector for converting the first digital signal to a synchronous serial digital signal; and a strain relief means connected to the housing for interconnecting the DIN type connector and the housing.

BRIEF DESCRIPTION OF THE DRAWINGS

The foregoing summary, as well as the following description of a preferred embodiment of the invention, will be better understood when read in conjunction with the appended drawings. For purposes of illustrating the invention, there is shown in the drawings an embodiment which is presently preferred. However, the invention is not limited to the particular arrangement and instrumentalities disclosed. In the drawings.

DESCRIPTION OF PREFERRED EMBODIMENTS

Figure 1:
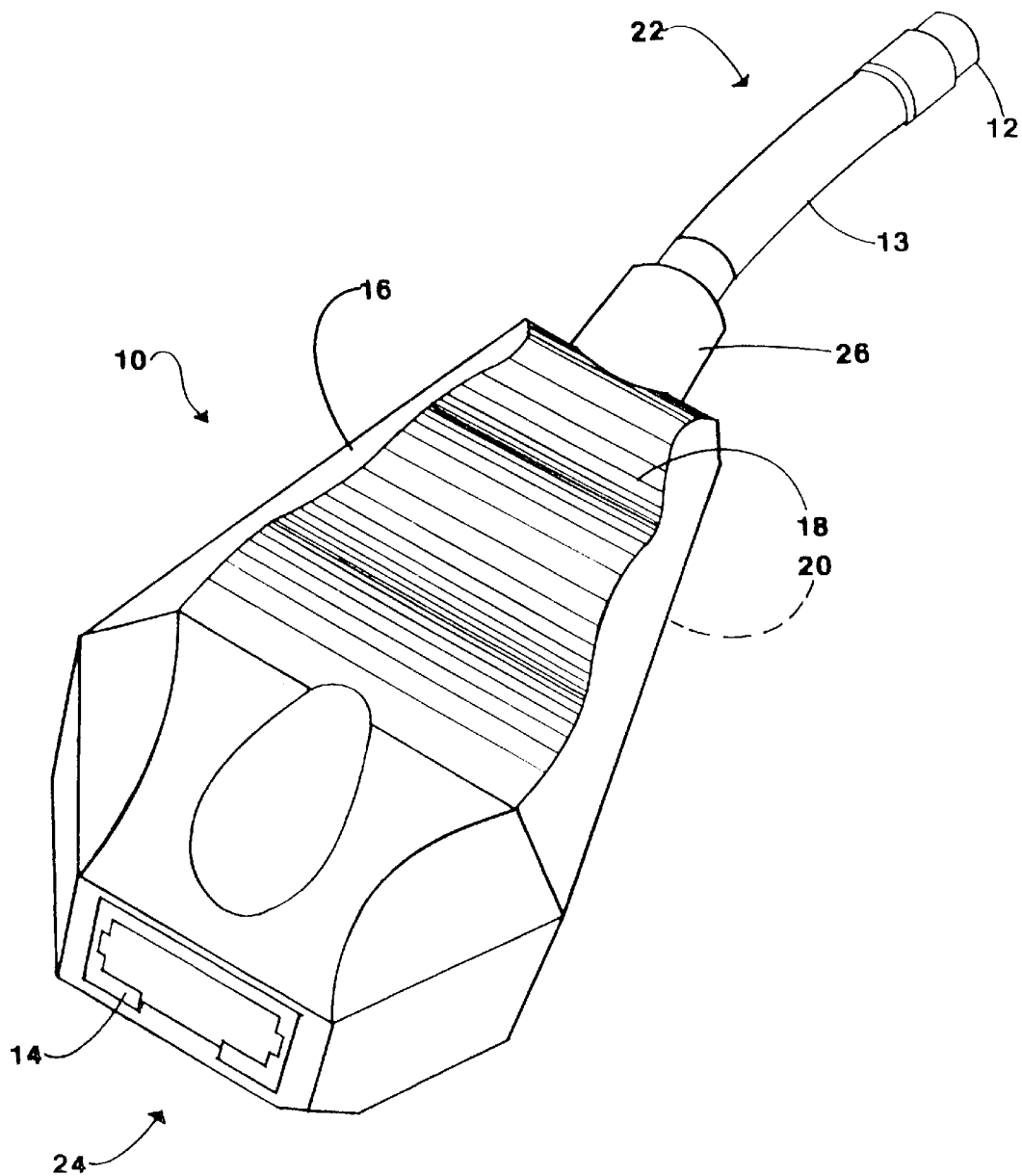
FIG. 1 is a perspective view of a preferred embodiment of an intelligent cable assembly in accordance with the present invention.

Certain terminology is used in the following description for convenience only and is not limiting. The words "top", "bottom", "lower" and "upper" designate directions in the drawings to which reference is made. The terminology includes the words above specifically mentioned, derivatives thereof and words of similar import.

Referring to the drawings, wherein like numerals are used for like elements throughout the several figures, there is shown in FIG. 1 a perspective view of an intelligent cable assembly or dongle 10 for connecting a modem device (not shown) to an ISDN communication line (not shown). The cable assembly 10 includes a first connector 12 for electrically connecting the cable assembly 10 to the modem device and a second connector 14 for electrically connecting the cable assembly 10 to the ISDN communication line. In the presently preferred embodiment, the first connector 12 comprises a nine (9) pin male DIN type connector which is received by a complementary female DIN type connector of the modem device. A nine pin DIN type connector is preferred due to its relatively small size, low cost, and wide commercial availability. However, as will be apparent to those of ordinary skill in the art, the first connector 12 could comprise a different type of connector which mates with a complementary connector of the modem device to which the cable assembly 10 is connectable.

In the presently preferred embodiment, the second connector 14 comprises a female RJ45 type connector for receiving a complementary male RJ45 type connector attached and electrically connected to the ISDN communication line. However, as with the first connector 12, the second connector 14 could comprise a different type of connector which is adapted to mate with a complementary connector attached to the ISDN communication line. However, an RJ45 type connector is preferred because such a connector is the industry standard or conventional connector type used in the United States. Since male and female DIN type connectors and male and female RJ45 type connectors are well known to those of ordinary skill in the art and such connectors are readily commercially available, further description of the structure and operation of the first and second connectors 12, 14 is not required for a complete understanding of the present invention.

The cable assembly 10 further comprises a housing 16 within which certain electrical components reside and within which the first and second connectors 12, 14 are electrically connected to each other so that digital signals can be transmitted through the cable assembly 10. The material from which the housing 16 is constructed may comprise a wide variety of materials with a principle requirement being to protect the electronic components enclosed therein from being damaged, such as by moisture or external physical forces, and to maintain the integrity of the electrical signals passing therethrough. In the presently preferred embodiment, the housing 16 is made of a polymeric material and is preferably constructed by injection molding. However, the housing 16 may be constructed from other materials which are desirable for housing electronic components, such as a material capable of shielding the electronic components therein from electromagnetic interference.

In the presently preferred embodiment, the housing 16 is shaped and contoured so that it is easy to hold and aesthetically pleasing. The housing 16 has opposing principle top and bottom surfaces 18, 20 and first and second opposing ends 22, 24. The first connector 12 is preferably attached to a multiconductor cable 13 extending from the first end 22 of the housing 16 and the second connector 14 is located at the second end 24 of the housing 16. However, as will be apparent to those of ordinary skill in the art, the cable 13 and the second connector 14 need not be located at the opposing ends 22, 24 of the housing 16, but could be located or positioned at a variety of locations on the housing 16, such as on the top surface 18, on opposing sides, on the bottom surface 20, or any other surface of the housing 16 which is convenient. In addition, it will be apparent to those of ordinary skill in the art that the first connector 12 could be directly connected to the housing 16, such that the cable assembly 10 does not include the multiconductor cable 13.

A strain relief means 26 is provided between the cable 13 and the housing 16 which interconnects the cable 13 and the housing 16. The strain relief means 26 preferably comprises a cylindrically shaped polymeric material which is generally flexible. The strain relief means 26 relieves strain on the cable 13 caused by forces exerted on the cable assembly 10 and aids in maintaining a good electrical connection between the cable assembly 10 and the modem device.

Figure 2:
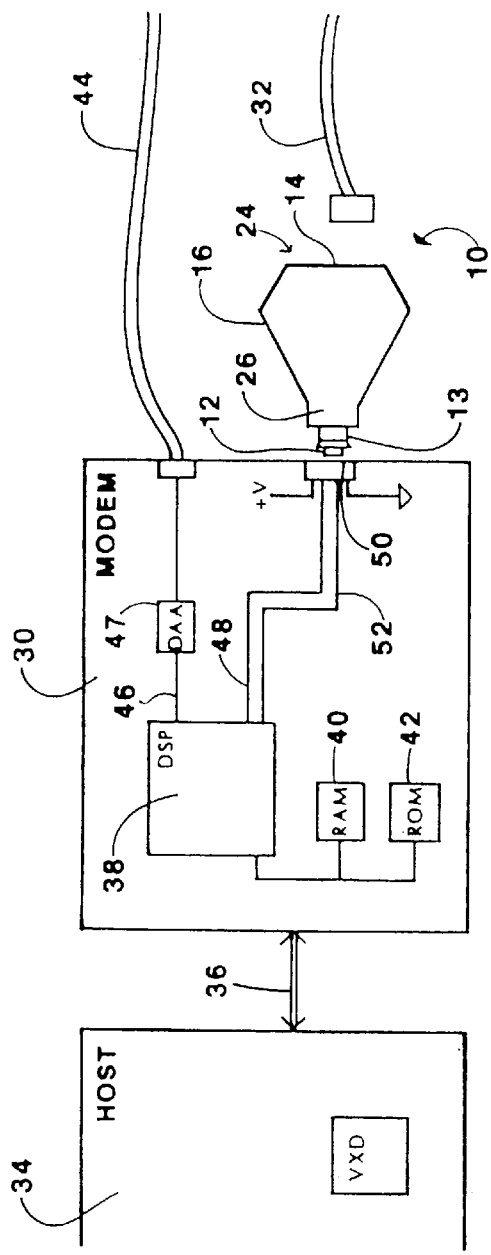
FIG. 2 is a schematic block diagram of a computer, an ISDN upgradeable modem, and the intelligent cable assembly of the present invention.

Referring now to FIG. 2, a schematic block diagram of the cable assembly 10 is shown for connecting a modem device 30 to an ISDN communication line 32. The modem device 30 is connected to or contained within a data terminal equipment (DTE) or a host processor 34. The host processor 34 can be any type of computer or processor including a suitable bus for interfacing to the modem device 30, such as a mainframe computer, a minicomputer, or typically, a PC, which can be either a desktop, laptop, notebook or any other processor based device. Preferably the modem device 30 interfaces with the host processor 34 via an input/output (I/O) bus 36 using an industry standard protocol, such as an Industry Standard Architecture (ISA) bus or a Personal Computer Memory Card International Association (PCMCIA) bus protocol. However, other suitable interface protocols could be used with the present invention, and thus, the particular interface protocol is not meant to be limiting to the inventive concepts disclosed herein.

The modem device 30 includes a processor 38, such as a digital signal processor (DSP) including a DSP memory space, such as a random access memory (RAM) 40 and a read only memory (ROM) 42, and means for allowing the host processor 34 to directly access the DSP memory space 40, 42 (i.e. a direct memory access). The modem device 30 supports transmission and reception of data over a communication line, such as a POTS line, indicated at 44, as is known to those of ordinary skill in the art. The modem device 30 is typical of previously known modem devices in many respects. However, one important difference between the modem device 30 and prior art modem devices is the inclusion of the direct memory access, which allows for a new program or operating code to be downloaded to the modem device 30 from the host processor 34 at any time, thus facilitating upgrading the feature set of the modem device 30. That is, software program code for supporting ISDN communications can be downloaded to the modem device 30 from the host computer 34 so that the modem device 30 can be connected to the ISDN communication line 32 for receiving digital data.

The modem device 30 also provides two codec interfaces 46, 48, respectively. The first codec interface 46 and a direct access arrangement (DAA) 47 provide an analog interface to the POTS communication line 44, as is known to those of ordinary skill in the art. Since codec circuits and DAAs are known by those of ordinary skill in the art, further description of these circuits is not provided. Moreover, further description of these circuits is not required for a complete understanding of the present invention.

The second codec interface 48 allows the modem device 30 to also be connected to the ISDN communication line 32. The codec interface 48 comprises a three wire serial bus which extends between the modem processor 38 and an ISDN connector 50 for transmitting signals therebetween, including a cable assembly enable signal, a codec data out signal and a codec data in signal.

A bus 52 connects the modem processor 38 and the modem ISDN connector 50. The bus 52 comprises a three wire bus for transmitting control and configuration information signals between the modem processor 38 and the cable assembly 10, including a serial clock signal, a first frame synchronization signal and a second frame synchronization signal. In addition, power and ground signals are also connected to the modem ISDN connector 50.

The ISDN connector 50 is adapted to receive the first connector 12 of the cable assembly 10. Preferably, the ISDN connector 50 comprises a nine (9) pin female DIN type connector. DIN type connectors such as the preferred 9-pin DIN type connector are known to those of ordinary skill in the art. The ISDN connector 50 has the following pinout:

Pin 1—enable signal;
Pin 2—codec data out;
Pin 3—codec data in;
Pin 4—serial clock signal;
Pin 5—first frame synchronization signal
Pin 6—second frame synchronization signal;
Pin 7—power (+5 v);
Pin 8—ground;
Pin 9—unused.

Figure 3:
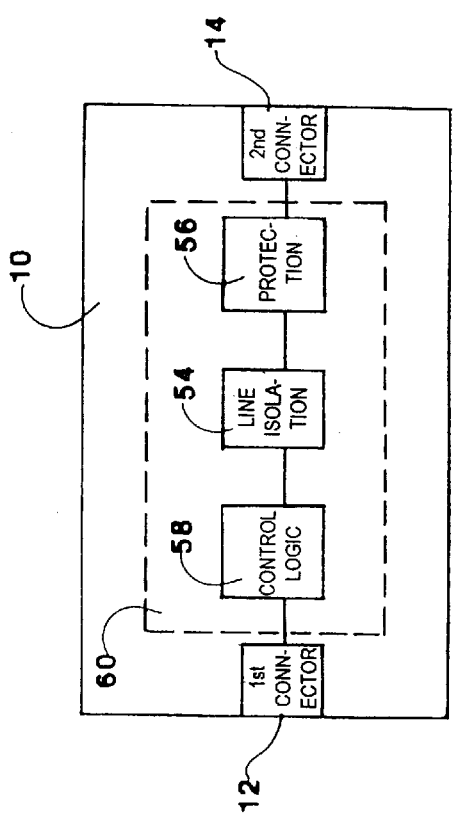
FIG. 3 is a functional block diagram of the intelligent cable assembly of the present invention.

Referring now to FIG. 3, a functional block diagram of the intelligent cable assembly 10 of the present invention is shown. Internally, the cable assembly 10 generally comprises line isolation means 54 for electrically isolating the ISDN communication line 32 from the modem device 30, protection means 56 electrically connected to the line isolation means 54 and the ISDN communication line 32 for protecting the modem device 30 from electrical transients occurring on the ISDN communication line 32, and control logic 58 for converting a first digital signal received from the modem device 30 to a synchronous serial digital signal to be transmitted over the ISDN communication line 32. Preferably, the line isolation means 54, the protection means 56 and the control logic 58 are mounted on a printed circuit board 60, which is housed within the cable assembly 10.

The line isolation means 54 preferably comprises a transformer, such as those transformers which are known to those of ordinary skill in the art of telephone and modem communications. Alternatively, as is also known to those of ordinary skill in the art, other isolation means, such as opto-electric or capacitive isolation means can be substituted for the transformer.

The protection means 56 comprises a DC current capture means and one or more protection diodes and/or one or more current limiting resistors for protecting the modem device 30 from electrical transients occurring on the ISDN communication line 32, as is known to those of ordinary skill in the art.

The control logic 58 converts a modem signal to a synchronous serial signal to be transmitted over the ISDN communication line 32, and generally comprises either a U interface or an ST interface as described in the aforementioned ANSI T1.601 standard, and includes the following functional signals:

B1: 8-bit sample of the first 64 kbit/sec user data channel;

B2: 8-bit sample of the second 64 kbit/sec user data channel;

Monitor Channel: 8-bit time slot used to exchange control and status information (except line activation and deactivation which is done in the C/I channel) with the layer 1 communication device;

D Channel: 2-bit sample of the ISDN call-control signaling channel;

C/I Channel: 4-bit time slot used to exchange line activation/deactivation commands and status information with the layer 1 communication device; and A and E bits: handshaking bits used when exchanging information over the Monitor Channel.

As is known to those of ordinary skill in the art, the U interface is the interface standard used in North America. In the U interface, the two B channels are full duplex lines, which are provided for transmitting digital signals. Since the two channels are full duplex, the control logic 58 provides echo cancellation. In addition, the control logic 58 provides line equalization to equalize signal frequency characteristics. In the ST interface, the two B channels are simplex, and not used for full-duplex data transmission. Rather, one B channel transmits in a first direction and the other B channel transmits in a second, opposite direction. Since the two B channels transmit data in only one direction, echo cancellation is not required. The data/signal conversion conducted by the control logic 58 is known by those of ordinary skill in the art and can be performed using commercially available integrated circuits. For instance, Motorola Corp. provides integrated circuits part nos. MC145572 and MC145574 for implementing an ISDN U-interface and an ISDN ST-interface, respectively. Other well known integrated circuit manufacturers also provide ISDN U and ST interface circuits. Although it is presently preferred to use an integrated circuit to implement the control logic means 58, it will be apparent to those of ordinary skill in the art that discrete logic could also be used to implement the control logic means 58. In addition, although it is presently preferred to convert ISDN signals to a synchronous serial digital signal processed by the modem device 30, it will be understood by those of ordinary skill in the art that the control logic 58 could convert the ISDN signal to either a synchronous or asynchronous serial or parallel signal.

The control logic 58, line isolation means 54, and the protection means 56 are preferably mounted on the PCB 60, which provides electrical connectivity therebetween. These components 54–58 are then maintained within an overmolded cable (i.e. the housing 16).

From the foregoing description, it can be seen that the present invention comprises an intelligent cable assembly for connecting a modem device to an ISDN communication line. It will be recognized by those skilled in the art that changes may be made to the above-described embodiment of the invention without departing from the inventive concepts thereof. It is understood, therefore, that this invention is not limited to the particular embodiments disclosed but is intended to cover all modifications which are within the scope and spirit of the invention as defined by the appended claims.

We claim:

1. An intelligent cable assembly for connecting a modem device to an ISDN communication line for allowing the modem device to transmit a first digital signal over the ISDN communication line and to receive a second digital signal transmitted over the ISDN communication line, the cable assembly comprising:

a first connector for electrically connecting the cable assembly to the modem device;

a second connector for electrically connecting the cable assembly to the ISDN communication line;

protection means electrically connected to the ISDN communication line by way of the second connector for protecting the modem device from electrical transients occurring on the ISDN communication line;

line isolation means electrically connected to the protection means for electrically isolating the ISDN communication line from the modem device; and control logic electrically connected to the line isolation means and the first connector for converting the first digital signal to a synchronous serial digital signal.

2. The cable assembly of claim 1 wherein the first connector comprises a DIN type connector.

3. The cable assembly of claim 2 wherein the first connector comprises a male DIN type connector.

4. The cable assembly of claim 1 wherein the second connector comprises an RJ45 type connector.

5. The cable assembly of claim 4 wherein the second connector comprises a female RJ45 type connector.

6. The cable assembly of claim 1 wherein the control logic comprises a U interface.

7. The cable assembly of claim 1 wherein the control logic comprises an ST interface.

8. The cable assembly of claim 1 wherein the line isolation means comprises a transformer.

9. The cable assembly of claim 1 wherein the line isolation means, the protection means and the control logic are mounted on a printed circuit board.

10. The cable assembly of claim 1 further comprising a housing within which the line isolation means, the protection means, and the control logic are maintained.

11. The cable assembly of claim 10 further comprising a strain relief means interconnecting the first connector and the housing.

12. The cable assembly of claim 10 wherein the first and second connectors are positioned on opposing ends of the housing.

13. An intelligent cable assembly for connecting a modem device to an ISDN communication line for allowing the modem device to transmit a first digital signal over the ISDN communication line and to receive a second digital signal transmitted over the ISDN communication line, the cable assembly comprising:

a DIN type connector for electrically connecting the cable assembly to the modem device;

an RJ45 type connector for electrically connecting the cable assembly to the ISDN communication line;

line isolation and protection means electrically connected to the RJ45 type connector for electrically isolating the ISDN communication line from the modem device and for protecting the modem device from electrical transients occurring on the ISDN communication line; and control logic electrically connected to the line isolation and protection means and the DIN type connector for converting the first digital signal to a synchronous serial digital signal.

14. The cable assembly of claim 13 wherein the control logic comprises a U interface.

15. The cable assembly of claim 13 wherein the control logic comprises an ST interface.

16. The cable assembly of claim 13 wherein the line isolation and protection means and the control logic are mounted on a printed circuit board.

17. The cable assembly of claim 13 further comprising a housing within which the line isolation and protection means and the control logic are maintained.

18. The cable assembly of claim 17 further comprising a strain relief means interconnecting the DIN type connector and the housing.

19. The cable assembly of claim 18 wherein the DIN type connector and the RJ45 type connector are positioned on opposing ends of the housing.

20. An intelligent cable assembly for connecting a modem device to an ISDN communication line for allowing the modem device to transmit a first digital signal over the ISDN communication line and to receive a second digital signal transmitted over the ISDN communication line, the cable assembly comprising:

a housing having opposing sides;

a DIN type connector disposed on a side of the housing, the DIN connector for electrically connecting the cable assembly to the modem device;

an RJ45 type connector disposed on a side of the housing, the RJ45 connector for electrically connecting the cable assembly to the ISDN communication line;

line isolation and protection means disposed within the housing and electrically connected to the RJ45 type connector for electrically isolating the ISDN communication line from the modem device and for protecting the modem device from electrical transients occurring on the ISDN communication line;

control logic disposed within the housing and electrically connected to the line isolation and protection means and the DIN type connector for converting the first digital signal to a synchronous serial digital signal; and a strain relief means connected to the housing for interconnecting the DIN type connector and the housing.

21. The cable assembly of claim 20 wherein the DIN type connector and the RJ45 type connector are positioned on opposing sides of the housing.

* * * * *